(12) United States Patent
Jennings et al.

(10) Patent No.: US 8,689,961 B2
(45) Date of Patent: Apr. 8, 2014

(54) OPTIMIZED CLUTCH BEARING LUBRICATION PATH FOR PRELOADED HYDRAULIC LINKAGE APPLICATIONS

(75) Inventors: Mark Kingston Jennings, Vancouver, WA (US); Mahesh Shashidhar Nesari, Charlotte, NC (US); Clinton Lee McClellan, Fort Wayne, IN (US); Daniel Vern Gochenour, Auburn, IN (US); Chad Louis Davis, Garrett, IN (US)

(73) Assignee: Eaton Corporation, Cleveland, OH (US)

( * ) Notice: Subject to any disclaimer, the term of this patent is extended or adjusted under 35 U.S.C. 154(b) by 326 days.

(21) Appl. No.: 13/068,981

(22) Filed: May 25, 2011

(65) Prior Publication Data

US 2011/0303476 A1 Dec. 15, 2011

Related U.S. Application Data

(60) Provisional application No. 61/353,817, filed on Jun. 11, 2010.

(51) Int. Cl.
*F16D 13/74* (2006.01)

(52) U.S. Cl.
USPC .......................... 192/113.5; 192/98

(58) Field of Classification Search
USPC .......................... 192/85.56, 113.5
See application file for complete search history.

(56) References Cited

U.S. PATENT DOCUMENTS

| 3,474,888 | A | * | 10/1969 | Carlson et al. | 192/85.57 |
| 4,969,547 | A | * | 11/1990 | Lionell | 192/98 |
| 5,004,086 | A | * | 4/1991 | Petzold et al. | 192/85.57 |
| 5,752,591 | A | * | 5/1998 | Beyer | 192/85.56 |
| 5,908,097 | A | * | 6/1999 | Grosspietsch et al. | 192/85.51 |
| 5,947,251 | A | * | 9/1999 | Goins | 192/89.26 |
| 2003/0127298 | A1 | * | 7/2003 | Grillo | 192/98 |
| 2007/0235280 | A1 | * | 10/2007 | Otto | 192/98 |

\* cited by examiner

*Primary Examiner* — Rodney Bonck
(74) *Attorney, Agent, or Firm* — Warn Partners, P.C.

(57) ABSTRACT

The present invention provides an arrangement of a vehicle with a clutch release bearing and a lubrication path through a bell housing of a transmission.

15 Claims, 3 Drawing Sheets

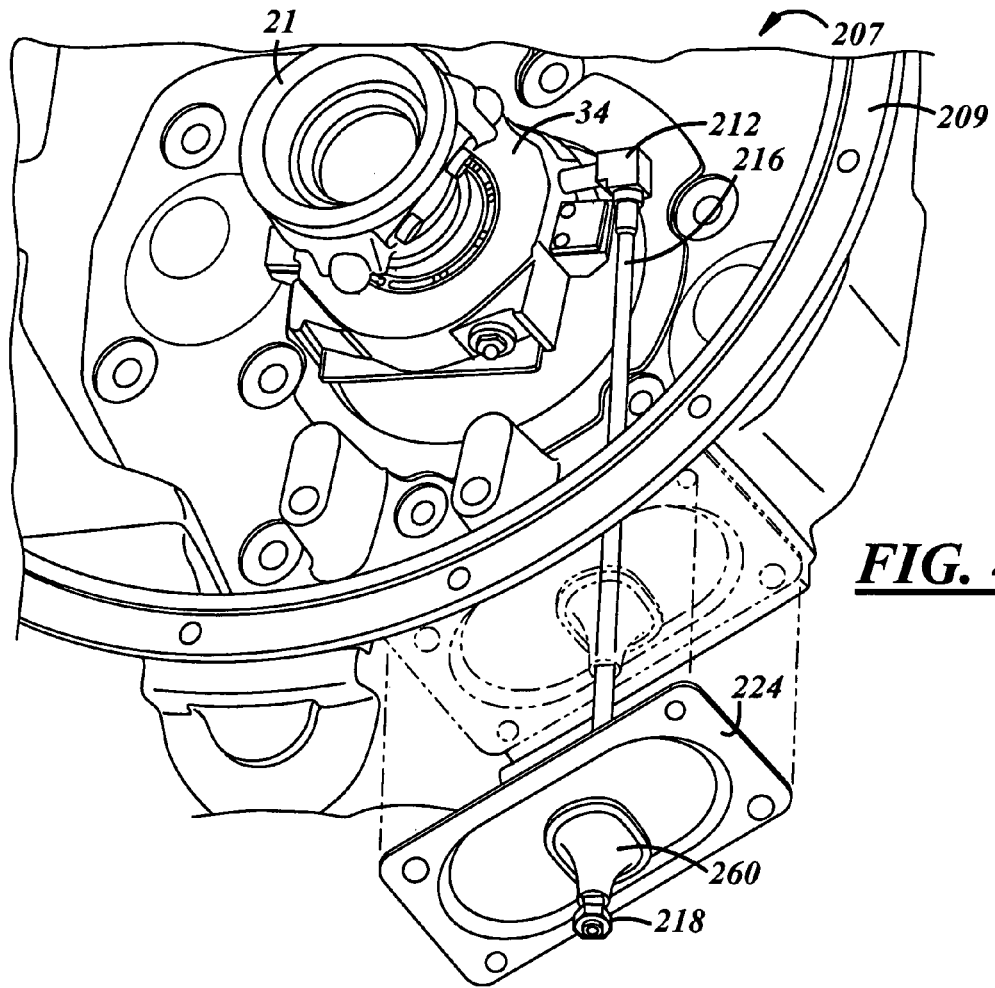

OPTIMIZED CLUTCH BEARING LUBRICATION PATH FOR PRELOADED HYDRAULIC LINKAGE APPLICATIONS

CROSS-REFERENCE TO RELATED APPLICATIONS

This application claims the benefit of U.S. Provisional Application No. 61/353,817, filed Jun. 11, 2010.

FIELD OF THE INVENTION

The present invention relates to lubrication paths for a clutch release bearing assembly.

BACKGROUND OF THE INVENTION

Typical truck like motor vehicle arrangements have two spaced apart supporting side rails. Supported between the side rails is an engine block forward of a transmission. The engine block is fixably connected with a bell housing of the transmission. To selectively torsionally connect a crankshaft of the engine with an input shaft of the transmission there is provided a clutch assembly 10.

An exemplary motor vehicle clutch assembly 10 is shown in FIG. 1. The clutch assembly 10 is disposed between the transmission input shaft 12 and an engine crank shaft (not shown). The clutch assembly 10 has an axis of rotation 13 about which the clutch assembly 10 and input shaft 12 rotate. A flywheel 14 is configured to be rigidly fixed to the engine crank shaft. A cover 16 is rigidly mounted to the flywheel 14. A pressure plate 18 is rotatably fixed to the cover 16 by means, such as one or more flexible straps 19, which allow the pressure plate 18 to move axially relative to the cover 16. A driven disc 20 is axially disposed between pressure plate 18 and flywheel 14.

A retainer 21, encircling a sleeve 36 is engaged by a plurality of apply springs 24 and levers 26. Levers 26 pivotably contact an adjusting mechanism 28 and engage the pressure plate 18. The apply springs 24 bias the levers 26 against the pressure plate 18.

To release the clutch assembly 10, thereby torsionally disconnecting the transmission from the engine there is provided a release bearing assembly 34. The release bearing assembly 34 is connected to the retainer 21 by the retainer sleeve 36. A snap ring keeps the release bearing assembly 34 on the sleeve 36. The release bearing assembly 34 includes both a bearing housing 42 and a roller bearing 40 with inner and outer races with the outer race non-rotatively placed therein. The release bearing assembly is typically lubricated with grease via a fitting on its housing.

To cause the release bearing assembly 34 to release the clutch 10 there is provided a release fork (not shown in FIG. 1). Prior to 1990, most release forks were manually operated by a linkage connected with a clutch pedal inside a vehicle cab. Typically the release fork had a stem oriented almost horizontally. Accordingly a lube tube (commonly refereed to as a hose) was typically connected to the release bearing housing in the 6 o'clock position. The lube tube 6 o'clock position was the predominant design on large commercial truck vehicles.

To make operation of the vehicle clutch easier for the vehicle operator, a new hydraulically powered release fork design has been developed (shown in FIG. 2) commonly referred to as a catapult style release fork. Due to other design considerations, most catapult style release fork designs 107 with preloaded hydraulic linkages commonly used on commercial vehicles move the stem 120 of the fork 108 to the 6 o'clock or near 6 o'clock position. The catapult style clutch release fork eliminates the possibility of routing a lubrication path to the clutch release bearing 34 in the traditional manner that is well known throughout the commercial vehicle industry. As mentioned previously, in the manual linkage type release fork design (commonplace until approximately the late 1990's), a clutch release bearing lubrication path is simply routed using a lubrication or grease hose 77 fastened to a clutch release bearing grease port located on the bearing housing at the 6 o'clock position. The 6 o'clock release bearing grease port configuration allows the grease hose 77 to drop downward from the clutch release bearing housing and hang through the bottom of the transmission bell housing and provides an easy accessible grease point for the clutch release bearing (It should be noted that due to the lack of access from above, lubrication maintenance of the release bearing must occur from underneath the bell housing of the transmission). The geometry of the catapult style clutch release fork used with preloaded hydraulic linkages forces the running position of the clutch release bearing to be rotated 180 degrees which places the traditional grease port (sometimes referred to as fitting) on the clutch release bearing to be located in the 12 o'clock or near 12 o'clock position. In this position, a standard grease hose cannot be utilized to create a lubrication path to the clutch release bearing. The current practice of using a non-traditional grease hose fastened to the clutch release bearing and exiting the transmission bell housing at a location other than the 6 o'clock position creates problems with lubricating the clutch release bearing and also increases the complexity of lubrication path routing for original equipment manufacturers (OEM) assembly personnel for new truck builds. With the grease point of the clutch release bearing located in the non-traditional position, the risk of truck service personnel missing a clutch service interval increases. This can lead to a premature clutch failure due to lack of lubrication to the release bearing. The non-traditional grease hose used with preloaded hydraulic linkage systems requires additional labor to fasten a grease hose 122 to the bearing itself and also the side of the transmission bell housing a bulk head type fitting 123 since the grease hose is not able to hang down in a vertical position. Another hose 125 is required to hang downward terminating in a lateral non-traditional position. Another problem is that the hose 122 from the release bearing housing to the bulk head receives great stress due the axial movement of the release bearing. Still another problem is that failure of the hose 122 or fitting from the bearing housing 42 to the bulk head is not observable by a maintenance worker working from underneath the transmission bell housing.

SUMMARY OF THE INVENTION

In a preferred embodiment, the present invention provides an arrangement of a strategically placed additional grease port in a clutch release bearing, a 90 degree fitting, standard grease hose and a new grommet design to enable the clutch lubrication path to be routed away from the catapult style release fork and provide the grease point of the clutch release bearing in the traditional 6 o'clock position familiar to truck service personnel.

The added grease port in the clutch release bearing housing, a special 90 degree fitting, a standard grease hose and a newly designed rubber grommet enables a lubrication path to the clutch release bearing that positions the clutch release bearing lubrication point at the traditional location even when using a catapult style release fork. A further feature is that the grommet retains an inspection plate to the grease hose of the transmission during maintenance operations.

BRIEF DESCRIPTION OF THE DRAWINGS

FIG. 4 is an enlarged partial exploded view of the vehicle and release bearing arrangement shown in FIG. 3;

FIG. 5 is a sectional view of the inspection plate shown in FIG. 4;

FIG. 6 is a bottom perspective view of the inspection plate and a grommet shown in FIG. 4; and FIG. 7 is a view taken along line 7 in FIG. 5.

DETAILED DESCRIPTION OF THE PREFERRED EMBODIMENTS

Figure 1:
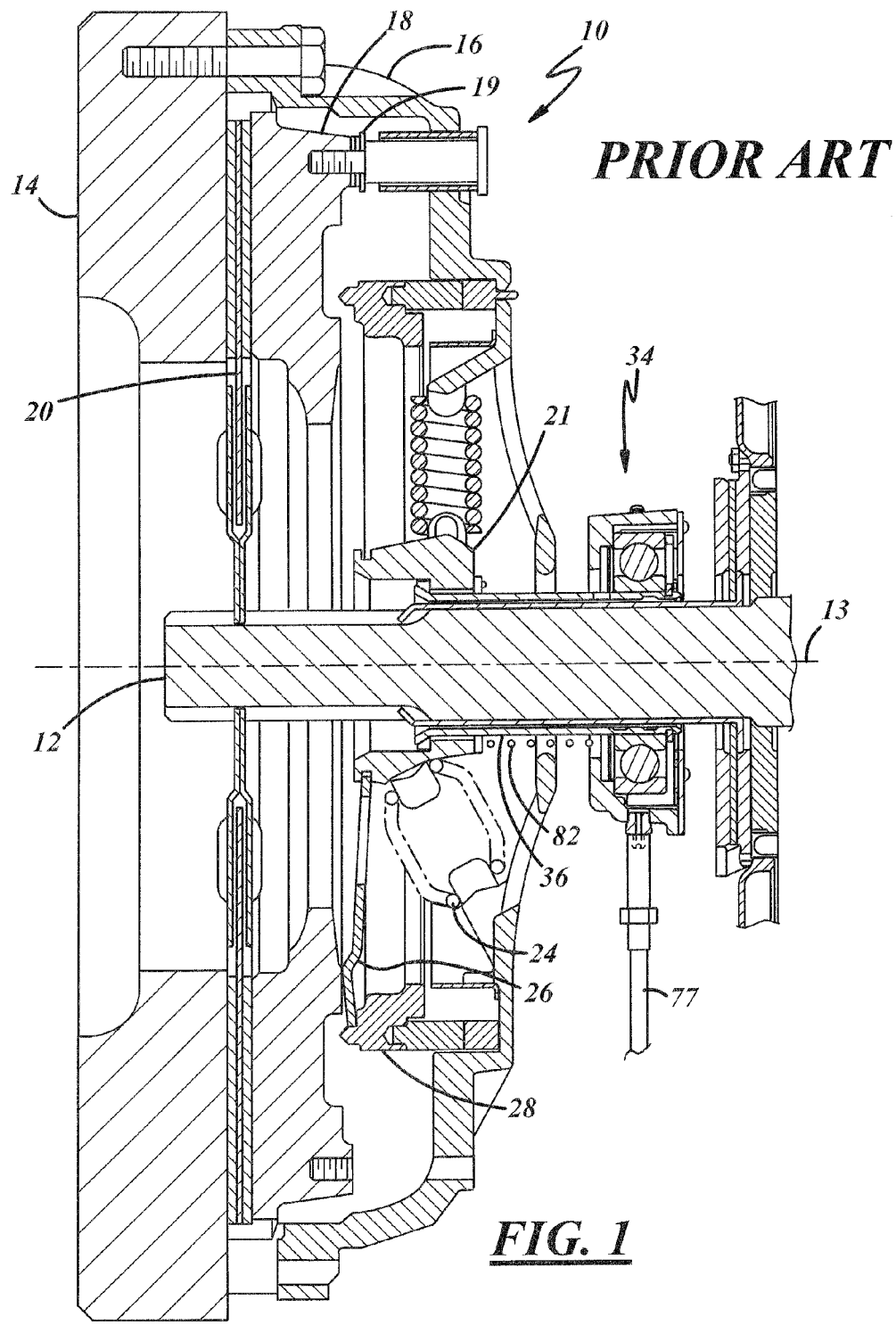
FIG. 1 is a cross-sectional view of a prior art release bearing lubrication arrangement.
Figure 2:
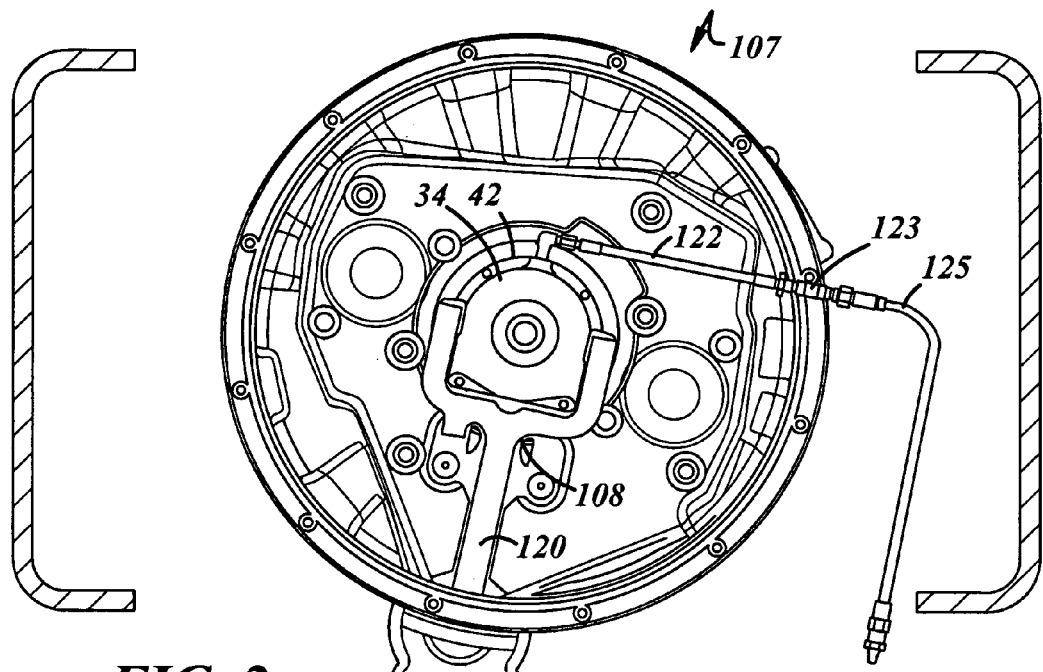
FIG. 2 is a front elevational view of an arrangement of a vehicle having a catapult style release fork.
Figure 3:
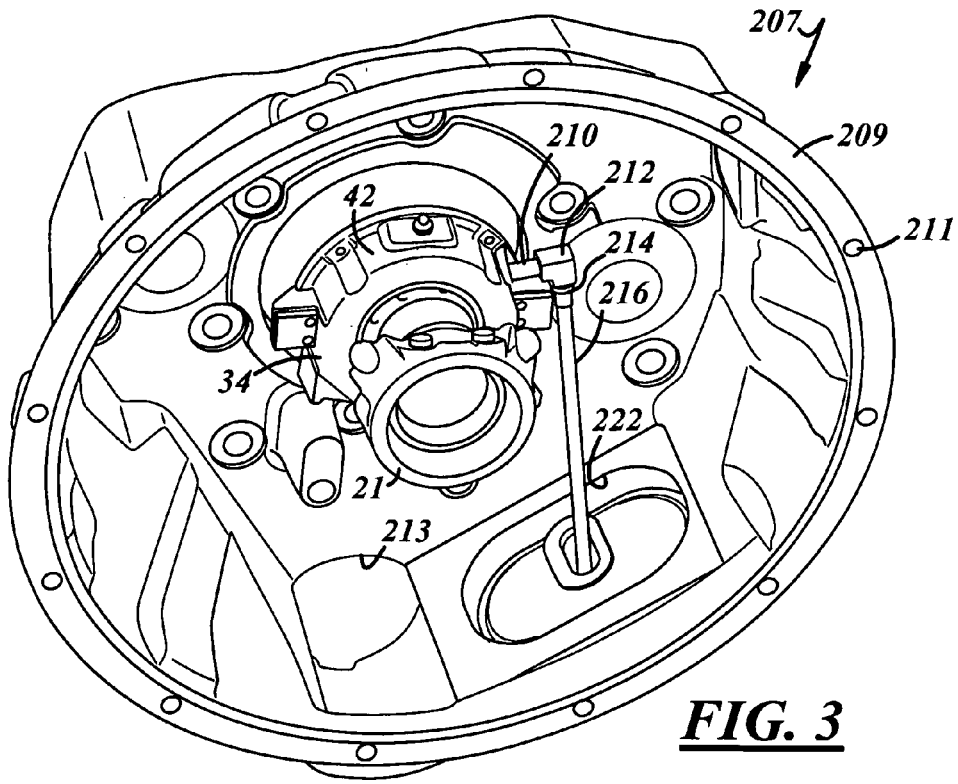
FIG. 3 is a perspective view of a vehicle and release bearing arrangement according to the present invention.

Referring to FIGS. 3-7 a motor vehicle arrangement 207 according to the present invention is provided. Parts performing like functions as those described in FIGS. 1 and 2 are given common reference numbers. Arrangement 207 has an engine and transmission as previously described that is supported by and between two parallel spaced side rails as previously described. The arrangement 207 has portions of the clutch assembly 10 removed for clarity of illustration. Arrangement 207 has a transmission with a bell housing 209. Bell housing 209 has a series of bolt holes 211 to allow the transmission to be rigidly connected to the engine block (not shown). The bell housing also has a hole 213 to allow for placement of a release fork (sometimes referred to as a release yoke, not shown in FIGS. 3-5) as previously described. It is clear from the location of hole 213 that the stem of the release fork extends from a 6 o'clock position or somewhere near the lower quadrant, (4:30-7:30 positions) and extends generally vertically. Arrangement 207 has a retainer 21 connected via a sleeve with a release bearing assembly 34 having a housing 42. Release bearing assembly 34 is commonly referred to a pull back type release bearing since a pull towards the transmission causes the release bearing to release the clutch 10. To provide a lubrication path, the housing 42 has rigidly attached via a rigid tube 210 an elbow 212. Fluidly connected with the elbow 212 via a fitting on its first end 214 is a lube tube 216. The lube tube 216 can be a rigid member but in most instances will be a flexible hose as shown. Hose 216 has a second end 218 with a fitting.

The bell housing 209 has an inspection port 222. The inspection port 222 is coved by a fastener secured removable inspection plate 224. The inspection plate has an aperture 230 for penetration of the lube tube 216. A major dimension 234 of the aperture 230 is approximately at least 2½ times a major cross-sectional dimension of the hose 216. The second end of the hose 216 penetrates the aperture 230.

A elastomeric rubber or plastic grommet 260 is provided. The grommet has a first interface 264 provided by a groove that seals an adjacent edge of the aperture 230 of the inspection plate. The grommet has a main body 266, slightly angled from its major plane 265 of the inspection plate to allow for a straight extension of the hose 216. The grommet has a second interface for sealing the hose 216 within the aperture 230 of the inspection plate. The second interface 268 has vapor grooves 272 to allow for the escape of moisture within the bell housing 209.

A major advantage of the arrangement 207 occurs during maintenance operations. Prior to the present invention it was quite common for the maintenance operator to lose or more commonly forget to replace the inspection plate over the inspection port. This often inadvertent error could cause major problem if ground moisture or dirt were allowed to enter the transmission bell housing during operation of the vehicle. The moisture or dirt contaminates could often foul the operation of the clutch assembly. The second interface 268 of the grommet 260 upon removal of the inspection plate 224 interacts with the fitting on the second end 218 of the hose to retain the inspection plate to the hose 216. Therefore the maintenance operator cannot misplace the inspection plate after a lubrication operation and is more likely to restore the inspection plate 224 to its proper connected position on the bell housing 209 thereby covering the inspection port 222.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An arrangement for a motor vehicle comprising:
  parallel spaced side rails for supporting an engine and transmission there between, said transmission having a bell housing for rigid connection with said engine and said bell housing having an inspection port;
  a clutch to allow for selective torsional connection of said transmission to said engine;
  a pullback type axially movable release bearing assembly operatively associated with said clutch to release the same, said release bearing assembly having a housing;
  a clutch yoke for pulling said release bearing housing, said clutch yoke having a generally vertically orientated stem extending from a lower quadrant;
  an elbow providing a lubrication path into said release bearing housing;
  a lube tube generally vertically connected with said elbow along a first end, and said lube tube having a second end with a fitting connected thereon;
  an inspection plate providing a removable cover for said inspection port, said inspection plate having an aperture for penetration of said lube tube; and
  a grommet having a first interface sealing said inspection plate aperture and a second interface slidably sealing said lube tube within said inspection plate aperture and wherein when said inspection plate is removed from said bell housing, said grommet second interface retains said inspection plate to said lube tube second end by interaction with said lube said second end fitting.

2. An arrangement as described in claim 1 wherein a major dimension of said inspection plate aperture is at least two and a half times a major diameter of said lube tube.

3. An arrangement as described in claim 1 wherein said grommet second interface has vapor grooves to allow vapor to escape from an interior of said transmission bell housing to an exterior of said grommet.

4. An arrangement as described in claim 1 wherein said grommet is angled with respect to a major plane of said inspection plate.

5. An arrangement as described in claim 1 wherein said grommet first interface has a groove and an edge of said inspection plate adjacent said inspection plate aperture is retained within said groove of said grommet.

6. An arrangement as described in claim 1 wherein said elbow is connected to a rigid tube connected with said release bearing housing.

7. An arrangement as described in claim 1 wherein said lube tube is flexible.

8. An arrangement for a release bearing assembly for a motor vehicle clutch providing selective torsional connection of an engine to a transmission having a bell housing with an inspection port comprising:
   a pullback type axially movable release bearing assembly having a housing;
   an elbow providing a lubrication path into said release bearing housing;
   a lube tube generally vertically connected with said elbow along a first end, and said lube tube having a second end with a fitting connected thereon;
   an inspection plate providing a removable cover for said inspection port, said inspection plate having an aperture for penetration of said lube tube; and
   a grommet having a first interface sealing said inspection plate aperture and a second interface slidably sealing said lube tube within said inspection plate aperture and wherein when said inspection plate is removed from said bell housing, said grommet second interface retains said inspection plate to said lube tube second end by interaction with said lube said second end fitting.

9. An arrangement as described in claim 8 wherein a major dimension of said inspection plate aperture is at least two and a half times a major diameter of said lube tube.

10. An arrangement as described in claim 8 wherein said grommet second interface has vapor grooves to allow vapor to escape from an interior of said transmission bell housing to an exterior of said grommet.

11. An arrangement as described in claim 8 wherein said grommet is angled with respect to a major plane of said inspection plate.

12. An arrangement as described in claim 8 wherein said grommet first interface has a groove and an edge of said inspection plate adjacent said inspection plate aperture is retained within said groove of said grommet.

13. An arrangement as described in claim 8 wherein said elbow is connected to a rigid tube connected with said release bearing housing.

14. An arrangement as described in claim 8 wherein said lube tube is flexible.

15. An arrangement for a release bearing assembly for a motor vehicle clutch providing selective torsional connection of an engine to a transmission having a bell housing with an inspection port comprising:
   a pullback type axially movable release bearing assembly having a housing;
   an elbow providing a lubrication path into said release bearing housing;
   a flexible hose generally vertically connected with said elbow along a first end, and said hose having a second end with a fitting connected thereon;
   an inspection plate providing a removable cover for said inspection port, said inspection plate having an aperture for penetration of said hose; and
   a rubber grommet having a first interface sealing said inspection plate aperture and a second interface slidably sealing said hose within said inspection plate aperture and having vapor grooves to allow the escape of moisture within said bell housing and wherein when said inspection plate is removed from said bell housing, said grommet second interface retains said inspection plate to said hose second end by interaction with said hose second end fitting.

* * * * *

UNITED STATES PATENT AND TRADEMARK OFFICE
CERTIFICATE OF CORRECTION

| | | |
|---|---|---|
| PATENT NO. | : 8,689,961 B2 | Page 1 of 1 |
| APPLICATION NO. | : 13/068981 | |
| DATED | : April 8, 2014 | |
| INVENTOR(S) | : Mark Kingston Jennings et al. | |

It is certified that error appears in the above-identified patent and that said Letters Patent is hereby corrected as shown below:

In the specification

Column 2
Line 40, please insert --using-- after --housing--.

Signed and Sealed this
Thirty-first Day of May, 2016

Michelle K. Lee
*Director of the United States Patent and Trademark Office*